United States Patent

Naskali

[11] Patent Number: 5,760,568
[45] Date of Patent: Jun. 2, 1998

[54] METHOD AND APPARATUS FOR CHARGING A BATTERY AND FOR DETERMINING A VOLTAGE OF THE BATTERY DURING CHARGING

[75] Inventor: Matti J. Naskali, Yliskulma, Finland

[73] Assignee: Nokia Mobile Phones Ltd., Finland

[21] Appl. No.: 690,055

[22] Filed: Jul. 31, 1996

[30] Foreign Application Priority Data

Sep. 5, 1995 [FI] Finland ............................... 954162

[51] Int. Cl.[6] ............................... H02J 7/00; H01M 10/44
[52] U.S. Cl. ............................... 320/5; 320/21; 320/14; 320/39; 320/19
[58] Field of Search ............................... 320/21, 19, 39, 320/40, 5, 14, 48

[56] References Cited

U.S. PATENT DOCUMENTS

| | | | |
|---|---|---|---|
| 4,736,150 | 4/1988 | Wagner | 320/21 |
| 5,179,335 | 1/1993 | Nor | 320/21 |
| 5,295,078 | 3/1994 | Stich et al. | 320/48 |
| 5,296,797 | 3/1994 | Bartlett | 320/21 |
| 5,321,347 | 6/1994 | Chien | 320/21 |
| 5,381,096 | 1/1995 | Hirzel | 320/48 |
| 5,408,170 | 4/1995 | Umetsu et al. | 320/39 |
| 5,446,364 | 8/1995 | Naskali | 320/2 |
| 5,523,667 | 6/1996 | Feldstein | 320/39 |

FOREIGN PATENT DOCUMENTS

| | | |
|---|---|---|
| 0311460 | 4/1989 | European Pat. Off. . |
| 0432690A2 | 6/1991 | European Pat. Off. ............ H02J 7/10 |
| 0657983A2 | 6/1995 | European Pat. Off. . |
| WO92/11680 | 7/1992 | WIPO . |

*Primary Examiner*—Peter S. Wong
*Assistant Examiner*—K. Shin
*Attorney, Agent, or Firm*—Perman & Green, LLP

[57] ABSTRACT

The invention is related to a charging device (1) in which the charging current ($I_{ch}$) used for charging a battery (2) is chopped according to a certain duty cycle ($\eta$). A certain charging voltage reference value ($V_{ch}$), which equals the real open circuit voltage of the battery charged, is known to the charging device (1). To achieve a correct duty cycle ($\eta$), the terminal voltage of the battery is measured during the charging current pulse ($I_{on}$) and between the pulses. The open circuit voltage of the battery is calculated on the basis of the measurement results using the formula $$V_{bat0} = V_{min} + K * \eta * (V_{max} - V_{min})$$

where $\eta$ is said duty cycle, $V_{max}$ represents the voltage between the terminals of said battery (2) during the charging current pulse ($I_{on}$), $V_{min}$ represents the voltage between the terminals of said battery (2) between the charging current pulses and the coefficient K equals 1 or the ratio of the average of the charging current ($I_{ch}$) to its peak value. The duty cycle is altered in such a manner that the calculated value ($V_{bat0}$) is brought close to said reference value ($V_{ch}$).

17 Claims, 5 Drawing Sheets

METHOD AND APPARATUS FOR CHARGING A BATTERY AND FOR DETERMINING A VOLTAGE OF THE BATTERY DURING CHARGING

FIELD OF THE INVENTION

The invention generally pertains to charging batteries with a power supply and is particularly related to determining the optimum voltage value during the charging of lithium batteries and to a device for charging small batteries.

BACKGROUND OF THE INVENTION

Because of their good power/weight ratio, lithium batteries and battery packs comprising lithium batteries are generally used as power sources in small, portable electric devices. During operation, a battery is discharged, after which it has to be recharged. To ensure the correct operation of the battery and a long battery life, it is important that the charging be performed in the correct manner.

Especially the voltage that is used for charging lithium batteries and generated by a charging device must very accurately follow the open circuit voltage of the battery, i.e. the voltage that would exist between the terminals of the battery if no charging current would flow to the battery or if no discharging current were drawn from the battery. When a battery is fully charged but still connected to a charging device, an incorrect charging voltage value harms the battery and shortens its life.

A charging method for lithium batteries is known from U.S. Pat. No. 4,736,150 which is based on chopping the charging current at the frequency of 0.1 to 10 hertz. A preferred embodiment of the method disclosed in the Patent employs a charging device generating a constant voltage and producing a relatively great charging current which, however, is limited below a certain maximum value, and chopped current superimposed on the charging current with a peak value of a few hundred milliamperes. Corresponding arrangements are known e.g. from Japanese Patent documents JP 152,002 and JP 5,114,422. The method sets no great requirements on the voltage source of the charging device, but the value of the chopped current and the duty cycle have to be determined relatively accurately. The problem is that to determine the duty cycle one should know the open circuit voltage of the battery charged, but it cannot be measured because either charging current flows to the battery or discharge current is drawn from the battery all the time.

SUMMARY OF THE INVENTION

It is an object of this invention to provide a method and a device with which the open circuit voltage of a battery can be determined during charging for the purpose of adjusting the charging conditions. It is another object of this invention to provide a method and a device as mentioned above the implementation of which is economical and suitable for mass production.

The objects of the invention are achieved by using a charging arrangement based on chopped, or pulsed, current, measuring the terminal voltage of the battery both during the current pulse and between the current pulses and by calculating the open circuit voltage of the battery on the basis of the measurement results using a method described later in this document.

It is characteristic of the method according to the invention, in which the battery is charged with the pulsed current according to a certain duty cycle, that in it the terminal voltage of said battery is measured during a pulse and between pulses of said charging current, the open circuit voltage of said battery is calculated on the basis of said measurements of the terminal voltage, the calculated open circuit voltage is compared with a certain reference value, and said duty cycle is altered on the basis of said comparison.

The invention is also directed to a device for implementing the method according to the invention. It is characteristic of the device according to the invention generating a pulsed charging current and including a control unit that it also includes measuring means for measuring the terminal voltage of the battery charged during a charging current pulse and between charging current pulses and means for delivering the measurement data indicating the measured voltage values to said control unit, and said control unit includes means for calculating the open circuit voltage of the battery charged on the basis of said measurement data, and means for altering the duty cycle of said pulsed charging current on the basis of said calculated open circuit voltage.

The method according to the invention is based on the use of a pulsed charging current and on the adjustment of the duty cycle to achieve a desired effective charging voltage. It is an advantage of this system that the output voltage of the DC power supply used in the charging device needs not be accurately adjusted, whereby it is possible to use a power supply with very low production costs. In the method according to the invention the voltage between the terminals of the battery is measured during a charging current pulse and between charging current pulses. The open circuit voltage of the battery charged is calculated on the basis of the measurements by adding to the latter the difference of the voltage values multiplied by the duty cycle used in the chopping of pulses (a ratio between 0 and 1 that indicates the temporal duration of a current pulse in relation to the time period of the chopped current) and, if necessary, by a correction coefficient the value of which depends on the charging device used in a manner described later. When the open circuit voltage of the battery has been calculated in the manner explained, the duty cycle used in the charging is altered according to certain rules described later in such a way that with the new duty cycle the calculated open circuit voltage of the battery would be nearer to the predetermined specification.

BRIEF DESCRIPTION OF THE DRAWINGS

Below, the invention is described in more detail with reference to a preferred embodiment presented as an example and to the attached drawing, in which

FIG. 3c is a logic flow diagram that illustrates in greater detail the function of the block 40' of FIG. 3a;

Corresponding parts in the figures are marked with identical reference numbers and markings.

DETAILED DESCRIPTION OF THE INVENTION

Figure 1:
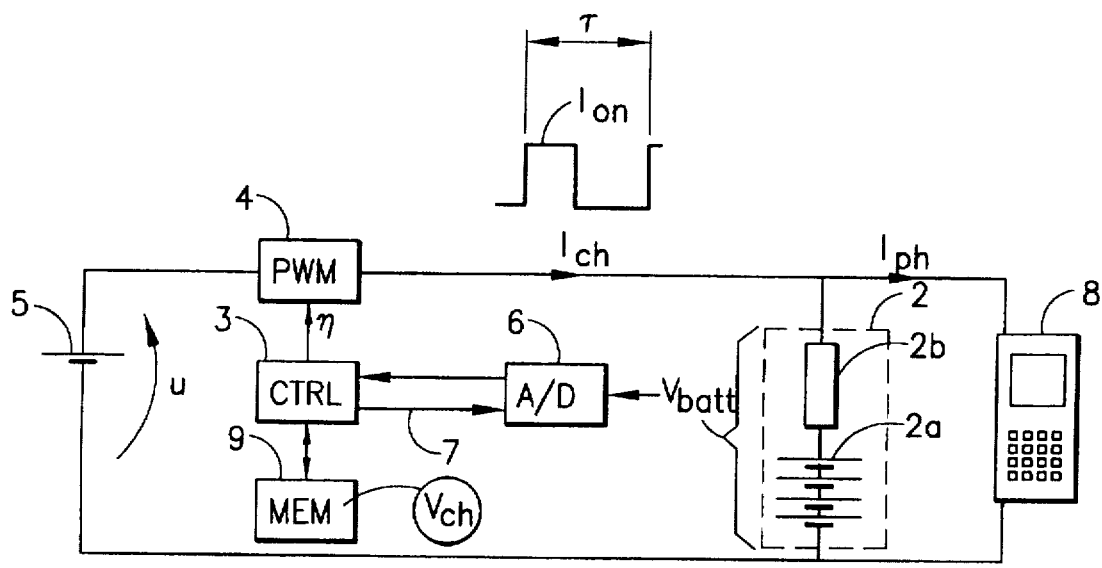
FIG. 1 is a circuit diagram of a charging device in accordance with the invention.

FIG. 1 shows a simplified circuit diagram of a charging device 1 connected to a battery 2 to be charged. The operation of the charging device 1 is controlled by a microprocessor 3 that gives to a pulse width controller 4 a desired duty cycle η, or the temporal duration of the current pulse $I_{on}$ in relation to the time period τ of the pulsing of the current. If the charging current $I_{ch}$ is on all the time, the duty cycle η is 1, and if it is not on at all, the duty cycle η is 0. For a pulsed charging current, the value of the duty cycle η is between these two extremes. The current pulsing period τ, or the time constant, is of no great significance to the invention, but advantageously the pulse frequency is from 0.1 to 10 hertz, whereby one pulse period lasts at the most ten and at least 0.1 seconds. A DC voltage supply 5 of the charging device, the output voltage of which is marked U, supplies a charging current $I_{ch}$ via the pulse width controller 4.

Pulsed charging current $I_{ch}$ is directed into the battery 2, between the terminals of which there is connected an A/D converter 6 to measure the voltage $V_{batt}$ of the battery 2. The A/D converter 6 converts the measured instantaneous battery voltage $V_{batt}$ to a digital number and inputs it to the microprocessor 3. The microprocessor can choose the sampling moment at which the A/D converter 6 measures the voltage $V_{batt}$ of the battery 2 by sending to it a control signal via a control line 7. A mobile phone 8, which is on during the charging of the battery, is also connected to the terminals of the battery 2. An electric current $I_{ph}$, the rate of which depends on the operating mode of the phone, flows to the mobile phone 8. In addition, the circuit includes as a separate unit a storage means 9 for saving and reading the program for the microprocessor 3 and the parameter values required by it. The battery 2 is shown as an equivalent circuit with an ideal voltage source 2a without an internal impedance and a resistor 2b the resistance $R_{batt}$ of which corresponds to the internal impedance of the real battery. Generally, the internal impedance of the battery depends, among other things, on the structure and age of the battery, and it can be calculated e.g. by connecting a constant current load to the battery and measuring the voltage between the terminals of the loaded battery, whereby the internal impedance of the battery equals the measured voltage divided by said constant current.

The open circuit voltage of the battery 2 cannot be measured, because during such a measurement no current should be supplied to or drawn from the battery. During a charging current pulse $I_{on}$ current is supplied to the battery from the charging device 1, and between the pulses current is drawn from the battery and directed into the mobile phone 8. According to the invention, the open circuit voltage of the battery 2 marked $V_{batt0}$ is calculated as follows:

$$V_{batt0} = V_{min} + K * \eta * (V_{max} - V_{min}),  \quad (I)$$

where η is the duty cycle and $V_{max}$ means the voltage between the terminals of the battery 2 measured by the A/D converter 6 during the current pulse $I_{on}$, and $V_{min}$ means the voltage between the terminals of the battery 2 between the current pulses. Coefficient K is 1, if the charging device is a DC power supply. In a second embodiment of the invention that employs a simple power supply implemented with a diode rectifier only, the average of the charging current $I_{ch}$ during the charging current pulse $I_{on}$ is a certain portion of its peak value, whereby the ratio of said average and said peak value is used as the value of coefficient K.

The measurement of the terminal voltage of the battery 2 and the charge current pulses $I_{ch}$ must not be synchronized in time so that the measurement of the voltage $V_{batt}$ occurs always at the same moment of time in relation to the pulsing period τ, since then the measurement would every time result in only either the $V_{max}$ or the $V_{min}$ value. In the charging device according to the invention, the measurement and pulsing can be actively desynchronized, whereby several (even dozens) measurements need to be performed with the A/D converter 6 to make sure that at least one representative of both the $V_{max}$ and the $V_{min}$ value is included in the measurements. Another alternative is to use the microprocessor 3 to control the beginning and end of the current pulses generated by the pulse width controller 4 and the sampling of the A/D converter so that the sampling is controlled both during the current pulse and between them. The latter method is a little more complicated from the microprocessor 3 standpoint, because in it part of the operation of the pulse width controller 4 is in fact transferred to the processor and precise timing is required of the program run in the processor.

Figure 2:
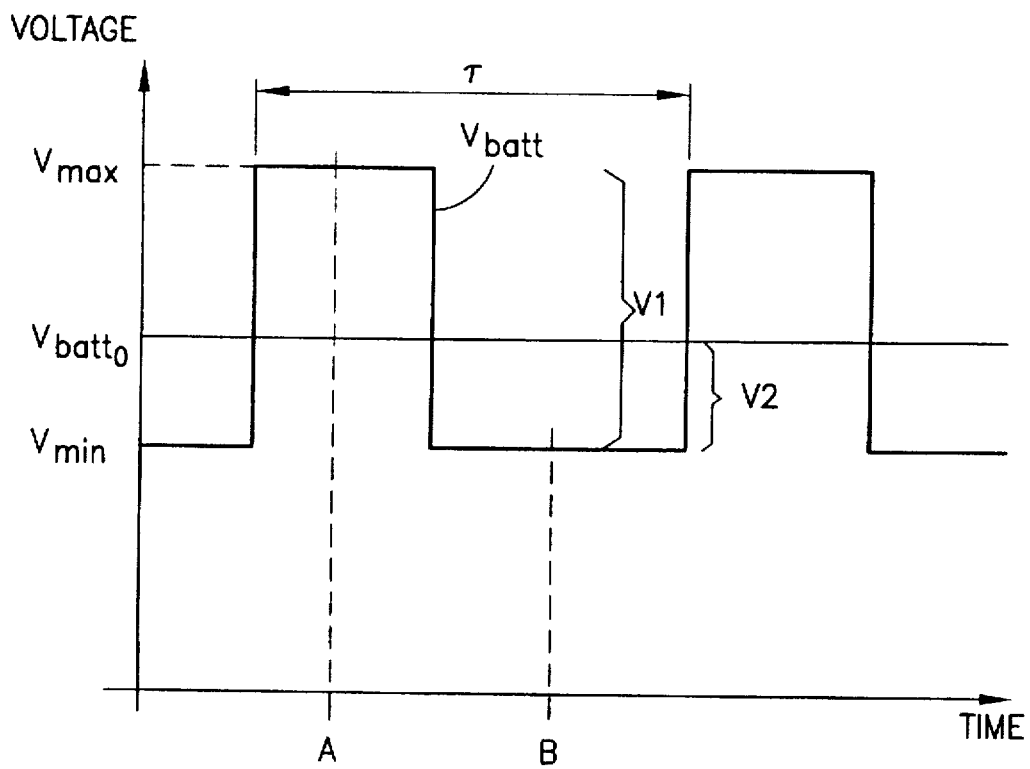
FIG. 2 is a graphical representation of a voltage $V_{batt}$ measured between terminals of a battery in accordance with a method of the invention, and a theoretical open circuit voltage $V_{batt0}$ of the battery.

FIG. 2 is a graphic representation of the real voltage $V_{batt}$ between the terminals of the battery 2, the behaviour of which is pulse-like corresponding to the charging current pulses, and the theoretical open circuit voltage $V_{batt0}$ that would exist between the terminals of the battery 2 without charging and current drawn by the mobile phone 8. The difference V1 of the voltage values measured during the charging current pulse (position A) and between the charging current pulses (position B) equals the product of the internal impedance $R_{batt}$ of the battery and the charging current $I_{ch}$, or ($R_{batt} * I_{ch}$). Since between the charging current pulses the mobile phone 8 generates practically a constant current load, it can be concluded that the difference V2 of the open circuit voltage $V_{batt0}$ of the battery 2 and the terminal voltage $V_{min}$ measured between the charging current pulses equals the product of the internal impedance $R_{batt}$ of the battery 2 and the current $I_{ph}$ flowing to the mobile phone 8, or ($R_{batt} * I_{ph}$).

Above it was stated that the open circuit voltage of the battery 2 cannot be measured during charging since at all times current is either drawn from the battery or supplied to the battery. However, to regulate the charging process it is necessary to use a voltage value to represent the assumed open circuit voltage. To illustrate the advantages of the invention, it will be next examined how big the charging voltage error, i.e. the difference of the voltage value used in charging to represent the open circuit voltage of the battery and the real open circuit voltage $V_{batt0}$ of the battery 2, is, if the value calculated with the formula (I) according to the invention is not used as the representing value, but instead different values are used, referring to the markings in FIG. 2.

Let us first assume that the open circuit voltage is represented by the minimum value $V_{min}$ of the voltage, ie. the terminal voltage value of the battery 2 between charging current pulses. Since it was stated above that the difference of the minimum value $V_{min}$ and the real open circuit voltage $V_{batt0}$ equals ($R_{batt} * I_{ph}$), the biggest possible charging voltage error is produced in a situation where the internal impedance $R_{batt}$ of the battery 2 is high (e.g. an old battery with small cells) and the mobile phone 8 draws a lot of current $I_{ph}$ (e.g. keypad lights and automatic scanning on). Using values $R_{batt}$=350 mΩ and $I_{ph}$=220 mA the charging voltage error becomes 77 mV. In a more favourable situation where the internal impedance $R_{batt}$ of the battery 2 is low (e.g. a new battery with large cells) and the mobile phone 8 draws only a little current $I_{ph}$ (e.g. when the phone is in so-called battery-saving state), the corresponding values are 100 mΩ, 10 mA and 1 mV.

Let us then assume that the value representing the open circuit voltage is the voltage $V_{max}$ between the terminals of the battery 2 during the charging current pulse. Looking at the markings in FIG. 2 and making a simple deduction we can see that the charging voltage error then equals [$R_{batt}$ * ($I_{ch}-I_{ph}$)]. The worst case is achieved with a high internal impedance $R_{batt}$ of the battery 2 and a small current consumption $I_{ph}$ by the mobile phone 8. With values $R_{batt}$=350 mΩ, $I_{ch}$=800 mA and $I_{ph}$=10 mA the charging voltage error becomes 277 mV. In a more favourable case, with the values of the above example, $R_{batt}$=100 mΩ and $I_{ph}$=220 mA, the charging voltage error becomes 58 mV.

The average of the voltage values $V_{max}$ and $V_{min}$ mentioned above can also be used as the value representing the open circuit voltage of the battery 2. A simple deduction then yields the expression [$R_{batt}$ * (0.5 * $I_{ch}-I_{ph}$)] for the charging voltage error, whereby we get the biggest possible error 137 mV with the values $R_{batt}$=350 mΩ, $I_{ch}$=800 mA and $I_{ph}$=10 mA, and the smallest possible error 18 mV with the values $R_{batt}$=100 mΩ, $I_{ch}$=800 mA and $I_{ph}$=220 mA.

The formula (I) according to the invention for determining the open circuit voltage of the battery is based on a deduction saying that when the battery 2 is fully charged, no charging current on average enters the battery, because the charging current $I_{ch}$ generated by the charging device 1 charges the battery 2 during the current pulse $I_{on}$ by the same amount that is discharged between the charging current pulses $I_{on}$ through the mobile phone 8 functioning as a load. Then the charge brought to the system during the charging current pulse $I_{on}$ by the charging device 1, equalling ($I_{ch}$ * ητ), equals the charge consumed by the mobile phone 8 during the whole pulse period. The expression for the latter charge is ($I_{ph}τ$). Since it can also be stated, looking at the markings in FIG. 2, that the difference of the maximum and minimum voltage equals the product of the internal impedance of the battery and the charging current, $V_{max}-V_{min}$= ($R_{batt}$ * $I_{ch}$), and the open circuit voltage of the battery is expressed $V_{batt0}=V_{min}+(R_{batt} * I_{ph})$, we will arrive in the mathematical deduction $$\begin{cases} I_{ch}ητ = I_{ph}τ \\ V_{max} - V_{min} = R_{batt}I_{ch} \\ V_{batt0} = V_{min} + R_{batt}I_{ph} \end{cases}$$

$$\rightarrow V_{batt0} = V_{min} + ηR_{batt}I_{ch}$$

$$\rightarrow V_{batt0} = V_{min} + η(V_{max} - V_{min})$$

The last line is identical with the formula (I) except for the correction coefficient K included in the formula (I). The deduction above is valid for a DC charging device for which the value of the correction coefficient K is, as stated earlier, 1. If the average of the charging current $I_{ch}$ is (K * $I_{ch}$), the charge brought to the system by the charging device is expressed as (K * $I_{ch}$ * ητ), wherefrom, by repeating the deduction above, we get the formula (I). In theory, the open circuit voltage of the battery is obtained error-free according to the formula (I). Laboratory measurements have verified that when a value calculated with the formula (I) according to the invention is used to represent the open circuit voltage of the battery, the charging voltage errors are smaller than 60 mV when using the mininmum voltage value $V_{min}$, the maximum voltage value $V_{max}$ or their average as the representing value.

As regards the structure and characteristics of the battery 2 charged, we know that when the battery is fully charged, its open circuit voltage has a certain value. In the embodiment described as an example it is possible to use a lithium battery the open circuit voltage of which, when fully charged, is 8.2 V. Advantageously, this voltage value is stored in the storage means 9 of the microprocessor 3, and it is called the charging reference value $V_{ch}$. In an alternative embodiment, a simple circuit can be included in the various batteries in the manufacturing stage, e.g. a resistor (not shown in the drawing) having a certain resistance, the value of which corresponds to the open circuit voltage of the battery according to a certain correspondence table. Then the charging device has a part (not shown) connected to that identification circuit, by means of which the charging device recognizes the type of the battery, whereby the microprocessor 3 can fetch from its storage means 9 the charging reference value $V_{ch}$ corresponding to that particular type of battery. Identification may be also based on the shape or other mechanical properties of the battery 2. In the method according to the invention, the voltage values $V_{max}$ and $V_{min}$ are measured and the open circuit voltage of the battery $V_{batt0}$ is calculated on the basis of those values and a known duty cycle η. The calculated value is compared with the charging reference value $V_{ch}$ mentioned above. If the calculated value $V_{batt0}$ is smaller than the charging reference value $V_{ch}$, the duty cycle η has to be increased, and, correspondingly, if the calculated value $V_{batt0}$ is bigger than the charging reference value $V_{ch}$, the duty cycle η has to be decreased. The rule or formula for changing the value of the duty cycle is as such insignificant, as long as it either increases or decreases the value of the duty cycle. An advantageous embodiment of the invention employs a certain set of fuzzy logic rules which, as a response to a certain difference of values $V_{batt0}$ and $V_{ch}$ and a change rate of value $V_{batt0}$ provides a certain change in the duty cycle η. The main principle is that if the calculated value $V_{batt0}$ is considerably smaller than the reference value $V_{ch}$, the duty cycle is altered considerably or it is even set to 1, whereby the charging current is on all the time. The closer to the reference value the calculated voltage $V_{batt0}$ is, the smaller the change made in the duty cycle. A person skilled in the art can easily draw up several alternative formulas or sets of rules to achieve the desired effect.

Figure 3A:
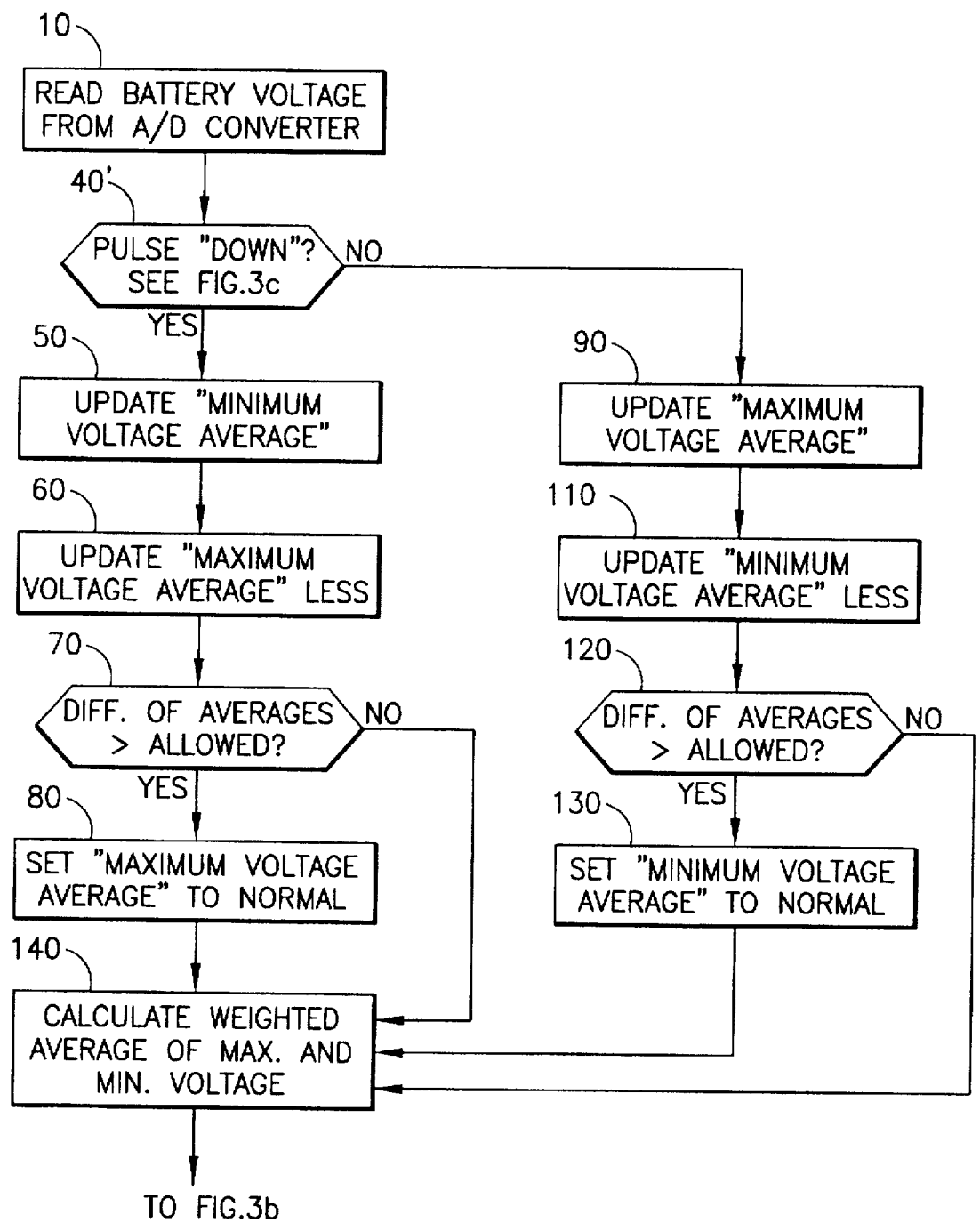
FIGS. 3a and 3b illustrate a logic flow diagram of a method in accordance with the invention.
Figure 3B:
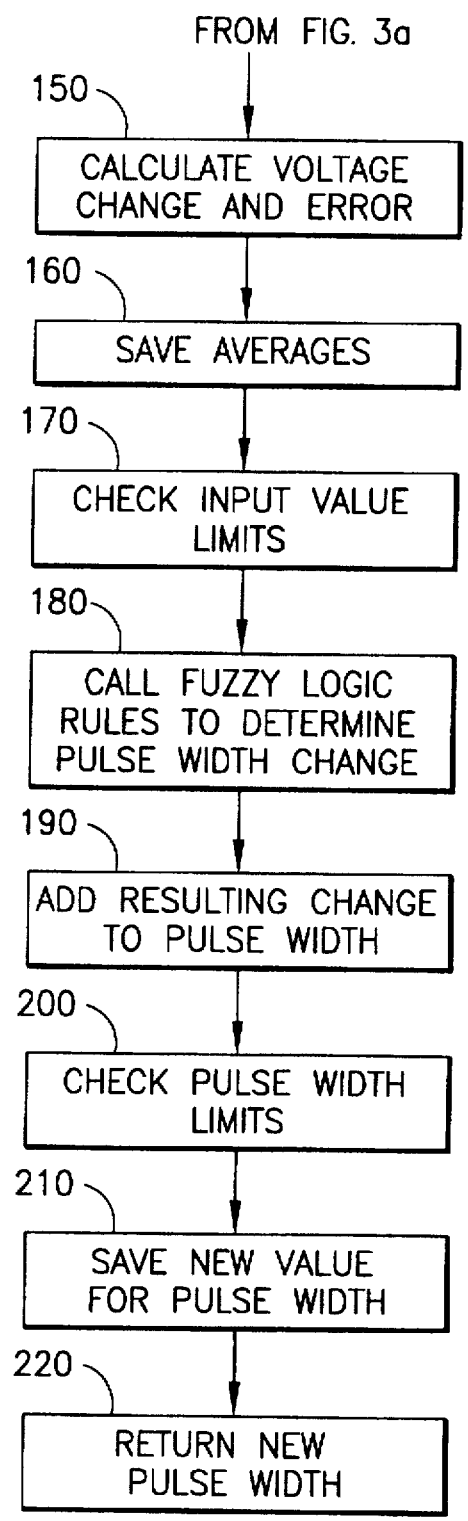
Figure 3C:
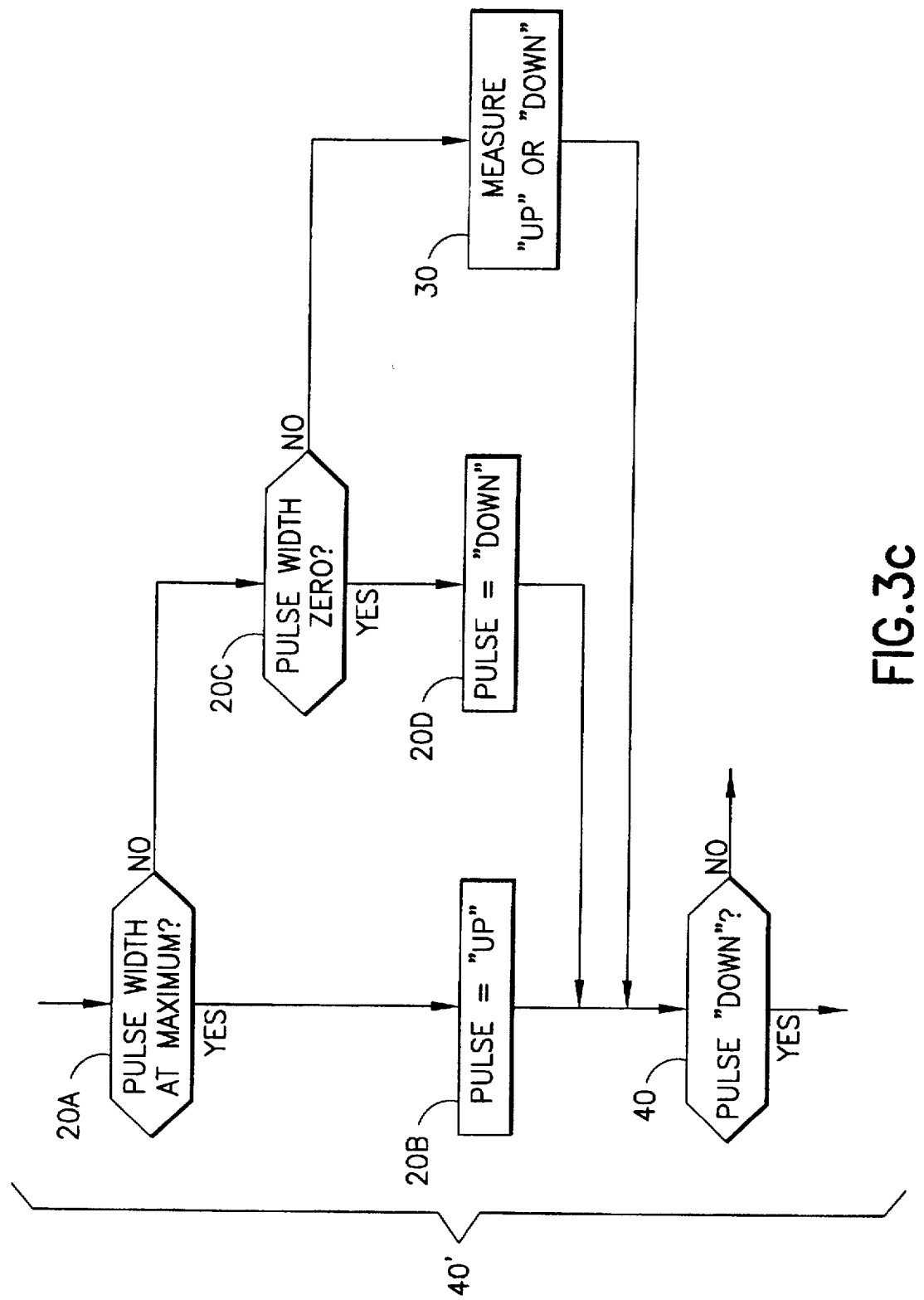

The preferred embodiment of the method according to the invention is illustrated by the logic flow diagram shown in FIGS. 3a–3c, and by Table 1 below which contains the pseudo-code of a computer program that comprises one whole adjustment cycle to adjust the duty cycle η of the charging device 1. Corresponding method steps of the invention shown in FIGS. 3a–3c and Table 1 are identified by the same reference numerals.

TABLE 1

| | |
|---|---|
| 10 | read battery voltage from A/D converter |
| 20A | IF pulse width is at maximum |
| 20B | pulse = 'up' |
| 20C | ELSEIF pulse width is zero |
| 20D | pulse = 'down' |
| 30 | ELSE determine by measuring whether pulse is 'up' or 'down' ENDIF |
| 40 | IF pulse is 'down' |
| 50 | update 'minimum voltage average' |
| 60 | update 'maximum voltage average' less |
| 70 | IF difference of averages is greater than allowed |
| 80 | set 'maximum voltage average' to normal distance ENDIF |
| 90 | ELSE |
| | update 'maximum voltage average' |
| 110 | update 'minimum voltage average' less |
| 120 | IF difference of averages is greater than allowed |
| 130 | set 'minimum voltage average' to normal distance ENDIF |

TABLE 1-continued

| 140 | calculate weighted average of maximum and minimum voltage |
| 150 | calculate voltage change and error |
| 160 | save averages |
| 170 | check input value limits before calling fuzzy logic rules |
| 180 | call fuzzy logic rules |
| 190 | add resulting pulse width change to pulse width |
| 200 | check pulse width limits |
| 210 | save new value for pulse width |
| 220 | RETURN new pulse width |

First, the battery voltage is read (Step 10). Since in the described embodiment the timing used for generating the current pulses is not known to the processor, ie. it does not know when the pulses start and end, it has to be checked, whether the measured value corresponds to the current pulse ($V_{max}$) or the current pulse interval ($V_{min}$) (see lines 20A–30 of Table 1, block 40' of FIG. 3a, and FIG. 3c which shows the steps of block 40' in greater detail). If the processor knows that the pulse width is set to the maximum or zero, as determined in steps 20A and 20C, respectively, the correspondence of the measurement is directly known and, hence, the variable 'pulse' is assigned the value 'up' (step 20B) or 'down' (step 20D). Otherwise, as shown on line 30, it has to checked by measuring whether the voltage produced by the A/D converter corresponds to the current pulse ('up', $V_{max}$) or the current pulse interval ('down', $V_{min}$).

Lines 40 to 80 are executed only if it is found out that the measured voltage corresponds to the pulse interval (value of pulse variable is 'down'). The average of the earlier minimum voltages in the memory is updated on the basis of the measurement result. On line 60 it is performed a cautious maximum voltage average update on an estimate basis, because tens of seconds may have been gone since the previous maximum voltage measurement, and if the minimum voltage has increased, it is probable that also the maximum voltage has increased. The difference of the updated averages is checked on line 70, and if it is greater than a certain predetermined limit value, then the maximum voltage average is set to a value at a certain normal distance from the calculated minimum voltage average, line 80. Lines 90 to 130, which are executed only if the pulse variable value is 'up', describe the corresponding operation starting from the maximum voltage measurement.

Figure 3D:
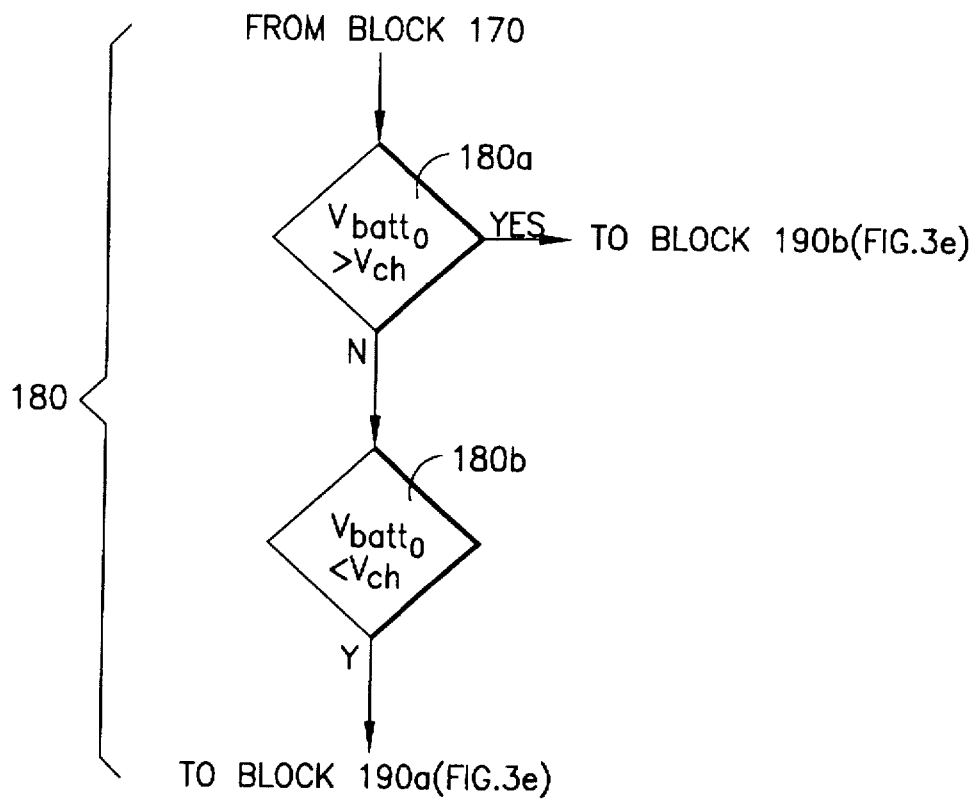
FIG. 3d is a logic flow diagram that illustrates in greater detail the function of the block 180 of FIG. 3b.
Figure 3E:
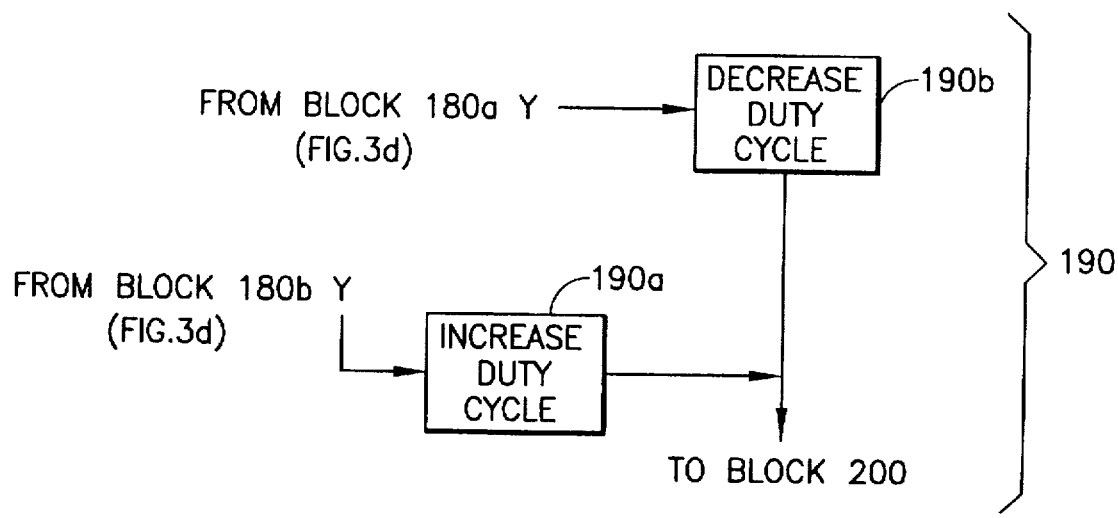
FIG. 3e is a logic flow diagram that illustrates in greater detail the function of the block 190 of FIG. 3b.

On line 140, it is calculated the weighted average of the minimum and maximum voltage representing the open circuit voltage of the battery using the formula (I) according to the invention that was discussed above. On the next line (150) it is calculated how much this value and the maximum and minimum values have changed from the previous measurement. These comprise the input data supplied to the fuzzy logic ruleset. They are saved on line 160 and their reasonableness is checked on line 170, lest measuring errors affect the adjustment. On line 180 a call is made to the fuzzy logic rules which on the basis of said input data indicate how much the duty cycle should be changed (blocks 180a and 180b of FIG. 3d). The change is added to the current duty cycle value on line 190 (see blocks 190a and 190b of FIG. 3e), and on line 200 it is checked that the resulting new duty cycle is between zero and one, ends included. Then the new duty cycle value is saved and sent to the pulse width controller (lines 210 and 220).

The value of the open circuit voltage $V_{batt0}$ of the battery, calculated using the formula (I) according to the invention, also provides a certain estimate for the instantaneous capacity, or the charge level, of the battery 2. In an embodiment of the invention, this feature is utilized by connecting to the charging device 1 an indicator (not shown in the drawing) operating on the basis of the calculated value $V_{batt0}$, indicating to the user the charge level of the battery at a given moment.

Using the formula (I) according to the invention it is possible to determine the open circuit voltage of a battery charged during pulsed charging for the purpose of adjusting the charging conditions. Since the formula takes into account the minimum and maximum voltage during the charging of the battery as well as the duty cycle used in the charging, it is particularly well suited for various situations in which the internal impedance of the battery adopts different values and the device coupled to the battery during the charging draws different amounts of current. In the preferred embodiment, the invention only requires of the hardware an ability to read or measure the voltage of the battery charged (meaning, usually, a simple A/D conversion) and programming of the microprocessor that controls the operation of the hardware or controlling of a pulse width modulator, so it will not require high production costs or precise, hardware-specific adjustments that would make it more difficult to apply the invention in mass production. Since charging voltage errors, when using the method and device according to the invention, are smaller than in prior art arrangements, the battery life will be prolonged.

What is claimed is:

1. A charging device (1) for charging a battery (2), including a power supply (5) and a pulse controller (4) for chopping according to a certain duty cycle ($\eta$) a charging current ($I_{ch}$) taken from said power supply (5) to the battery (2) being charged, characterized in that said charging device (1) further includes a measuring means (6) for measuring, during a pulse ($I_{on}$) of said charging current ($I_{ch}$) and between pulses of said charging current ($I_{ch}$), a terminal voltage of the battery (2) being charged and a control means (3) for altering the duty cycle ($\eta$) used by said pulse controller (4) on the basis of the measured terminal voltage.

2. The charging device of claim 1, characterized in that it further includes means for delivering measurement data ($V_{max}$, $V_{min}$) to said control means (3), and means (3) for calculating an open circuit voltage ($V_{batt0}$) of the battery (2) being charged, on the basis of said measurement data ($V_{max}$, $V_{min}$), for the purpose of determining a certain duty cycle ($\eta$), wherein said measurement data ($V_{max}$, $V_{min}$) indicate the terminal voltage of said battery measured during said pulse ($I_{on}$) of said charging current ($I_{ch}$) and between said pulses of said charging current ($I_{ch}$).

3. The charging device (1) of claim 1, characterized in that it further includes a storage means (9) for saving a charging reference value ($V_{ch}$) that corresponds to an open circuit voltage ($V_{batt0}$) of the battery (2) at the end of the charging.

4. The charging device (1) of claim 1, wherein said control means are included in a microprocessor.

5. A charging device (1) for charging a battery (2), including a power supply (5) and pulse width controller (4) for chopping according to a certain duty cycle ($\eta$) the charging current ($I_{ch}$) taken from said power supply (5) to the battery (2) charged, characterized in that it also includes a measuring means (6) for measuring, during charging, the terminal voltage of the battery (2) charged and a control means (3) for altering the duty cycle ($\eta$) used by said pulse width controller (4) on the basis of the measured terminal voltage, wherein said charging device (1) includes a means (3) for calculating the open circuit voltage ($V_{batt0}$) of the battery (2) charged on the basis of said measurement data ($V_{max}$, $V_{min}$) using the formula $$V_{batt0}=V_{min}+K*\eta*(V_{max}-V_{min})$$

where η is said duty cycle, $V_{max}$ represents the voltage between the terminals of said battery (2) during the charging current pulse ($I_{on}$), $V_{min}$ represents the voltage between the terminals of said battery (2) between the charging current pulses and the coefficient K equals 1, if said power supply (5) is a DC power supply, and it equals the ratio of the average value of the charging current ($I_{ch}$) to its peak value during the charging current pulse ($I_{on}$), if said power supply (5) is a diode-rectified AC power supply.

6. A method for charging a battery (2) with a charging device (1), comprising the steps of:

applying charging current pulses having a selected duty cycle (η) to the battery (2);

measuring a first voltage appearing across terminals of the battery (2) during one of the charging current pulses;

measuring a second voltage appearing across the terminals of the battery (2) between a pair of the charging current pulses; and altering the duty cycle (η) based on the measured first and second voltages.

7. A method as set forth in claim 6, further including the steps of:

calculating an open circuit voltage of the battery (2) based on the measured first and second voltages, and obtaining a resultant calculated open circuit voltage ($V_{bat0}$);

comparing the calculated open circuit voltage ($V_{bat0}$) to a reference value ($V_{ch}$); and altering the selected duty cycle (η) based on a result of the step of comparing.

8. The method of claim 7, characterized in that said reference value ($V_{ch}$) is pre-stored in a memory (9) of said charging device.

9. The method of claim 7, characterized in that said reference value ($V_{ch}$) corresponds to said battery (2) and is identifiable by said charging device on the basis of a certain electric or mechanical property of said battery (2).

10. The method of claim 7, wherein the step of altering is performed by either decreasing the selected duty cycle if the calculated open circuit voltage ($V_{bat0}$) of the battery (2) is greater than the reference value ($V_{ch}$), or increasing the duty cycle if the calculated open circuit voltage ($V_{bat0}$) of the battery (2) is smaller than the reference value ($V_{ch}$).

11. A method according to claim 9, wherein the battery is a mobile telephone battery.

12. A method according to claim 6, wherein the battery is a mobile telephone battery.

13. A method for charging a battery (2) with a charging device (1) where a charging current ($I_{ch}$) pulsed according to a certain duty cycle (η) is brought to said battery (2), characterized in that in it the terminal voltage of said battery (2) is measured and said duty cycle (η) is altered on the basis of the measurement result obtained, and wherein the open circuit voltage ($V_{bat0}$) of said battery is calculated on the basis of said terminal voltage measurements using the formula $$V_{bat0}=V_{min}+K*\eta*(V_{max}-V_{min})$$

where η is said duty cycle, $V_{max}$ represents the voltage between the terminals of said battery (2) during the charging current pulse ($I_{on}$), $V_{min}$ represents the voltage between the terminals of said battery (2) between the charging current pulses and the coefficient K equals 1, if a DC power supply is used in the charging, and it equals the ratio of the average value of the charging current ($I_{ch}$) to its peak value during the charging current pulse ($I_{on}$), if a diode-rectified AC power supply is used in the charging.

14. A charging device (1) for charging a battery (2) that is connected to a load, the charging device (1) including a power supply (5) and a pulse controller (4) for chopping according to a certain duty cycle (η) a charging current ($I_{ch}$) taken from said power supply (5) to the battery (2) being charged, said charging device (1) further including a measuring means (6) for measuring, during a pulse ($I_{on}$) of said charging current ($I_{ch}$) and between pulses of said charging current ($I_{ch}$), the terminal voltage of the battery (2), and a control means (3) for altering the duty cycle (η) used by said pulse controller (4) on the basis of the measured terminal voltage, wherein the charging current ($I_{ch}$) charges said battery (2) while said battery (2) is connected to said load.

15. A charging device (1) as set forth in claim 14, wherein ($V_{max}$) represents a value of the battery terminal voltage measured during the pulse ($I_{on}$) of said charging current ($I_{ch}$), wherein ($V_{min}$) represents a value of the battery terminal voltage measured between the pulses of said charging current ($I_{ch}$), and wherein said charging device (1) includes means (3) for calculating an open circuit voltage ($V_{bat0}$) of the battery (2) on the basis of said values ($V_{max}$) and ($V_{min}$), using a formula $$V_{bat0}=V_{min}+K*\eta*(V_{max}-V_{min})$$

where η is said duty cycle, K equals 1 if said power supply (5) is a DC power supply, and where K equals a ratio of an average value of the charging current ($I_{ch}$) to a peak value of the charging current ($I_{ch}$) during the charging current pulse ($I_{on}$) if said power supply (5) is a diode-rectified AC power supply.

16. A method for charging a battery (2) with a charging device (1) while the battery (2) is connected to a load, comprising the steps of:

applying charging current pulses having a selected duty cycle (η) to the battery (2) while the battery (2) is connected to the load;

measuring a first voltage appearing across terminals of the battery (2) during one of the charging current pulses;

measuring a second voltage appearing across the terminals of the battery (2) between a pair of the charging current pulses; and altering the duty cycle (η) based on the measured first and second voltages.

17. A method as set forth in claim 16, further comprising a step of:

calculating an open circuit voltage ($V_{bat0}$) of the battery based on the measured first and second voltages, in accordance with a formula $V_{bat0}=V_{min}+K*\eta*(V_{max}-V_{min})$, wherein η represents the selected duty cycle, $V_{max}$ represents the measured first voltage, and $V_{min}$ represents the measured second voltage; and wherein K is equal to 1 if a DC power supply is used for applying the charging current ($I_{ch}$) to the battery, and wherein K is equal to a ratio of an average value of the charging current ($I_{ch}$) to a peak value of the charging current ($I_{ch}$) during the charging current pulse ($I_{on}$) if a diode-rectified AC power supply is used for applying the charging current ($I_{ch}$) to the battery.

* * * * *